United States Patent [19]

Harbeke

[11] 4,313,286
[45] Feb. 2, 1982

[54] PIPE SUPPORT COUPLING AND METHOD OF USING SAME

[76] Inventor: Gerold J. Harbeke, 2807 S. Military Trail, Lake Worth, Fla. 33463

[21] Appl. No.: 94,928

[22] Filed: Nov. 16, 1979

[51] Int. Cl.³ .............................................. E04B 5/48
[52] U.S. Cl. ....................................... 52/220; 285/64; 285/174
[58] Field of Search ...................... 52/220; 285/64, 174

[56] References Cited

U.S. PATENT DOCUMENTS

| 3,731,448 | 5/1973 | Leo | 52/220 X |
| 3,800,486 | 4/1974 | Harvey | 52/220 X |
| 3,914,843 | 10/1975 | Antonacci | 52/220 X |
| 3,988,867 | 11/1976 | Väänänen | 52/220 X |

FOREIGN PATENT DOCUMENTS

| 579721 | 7/1959 | Canada | 52/220 |
| 612558 | 1/1961 | Canada | 52/220 |
| 2615428 | 10/1977 | Fed. Rep. of Germany | 285/64 |
| 660339 | 11/1951 | United Kingdom | 285/64 |

Primary Examiner—J. Karl Bell

[57] ABSTRACT

A device is disclosed adapted to be permanently embedded in the masonry floor of a building structure for both supporting and joining pipe sections extending above and below the floor. The device has anchor means formed integrally therewith which are surrounded by the masonry material to prevent movement of same relative to the floor. The ends of the device are of several different designs to permit the joining thereto of pipe ends by various methods also described.

10 Claims, 12 Drawing Figures

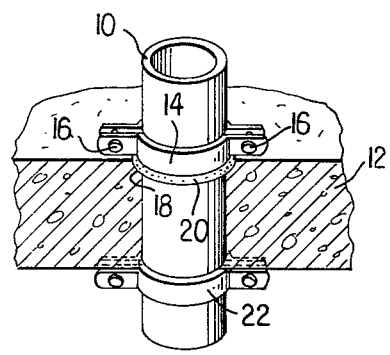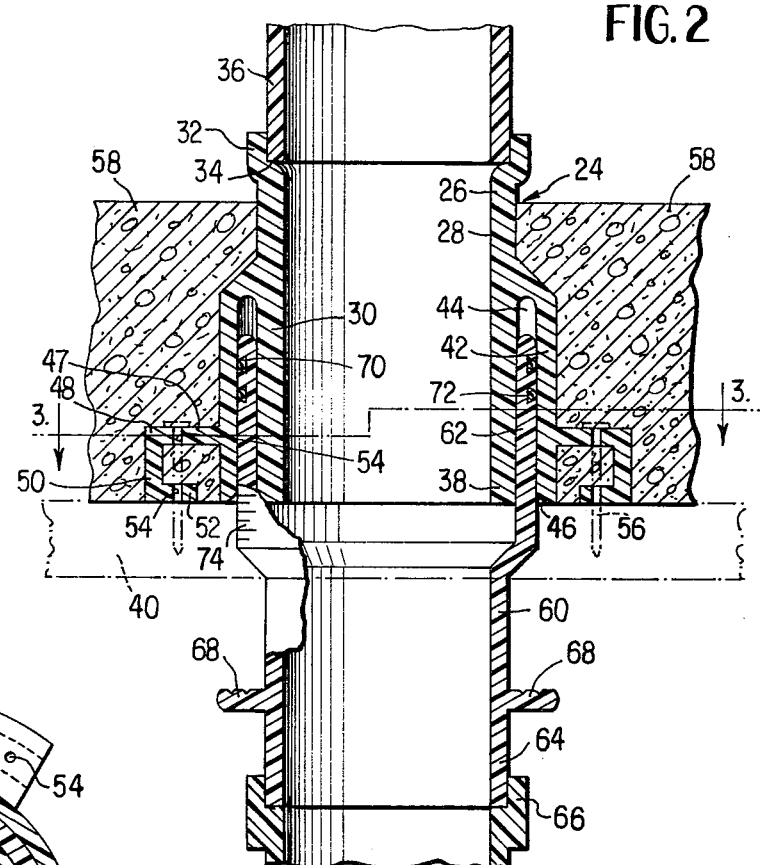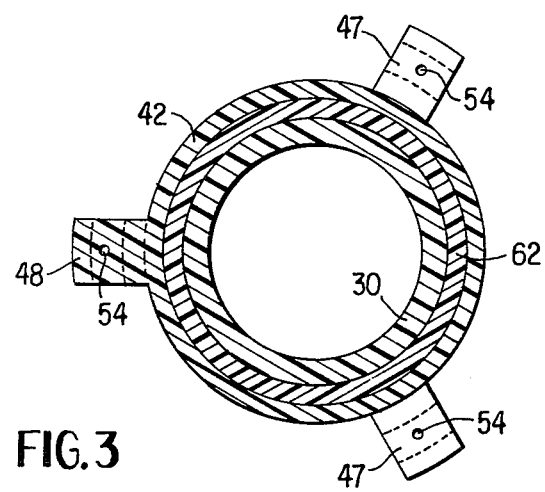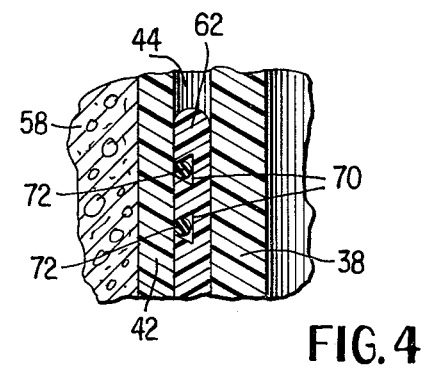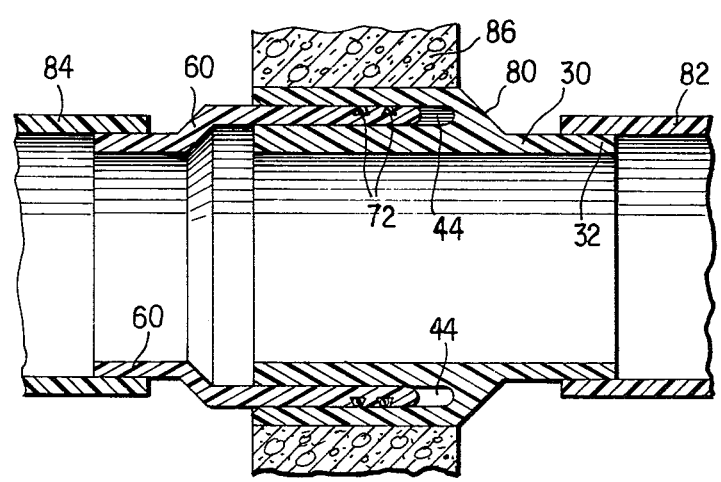

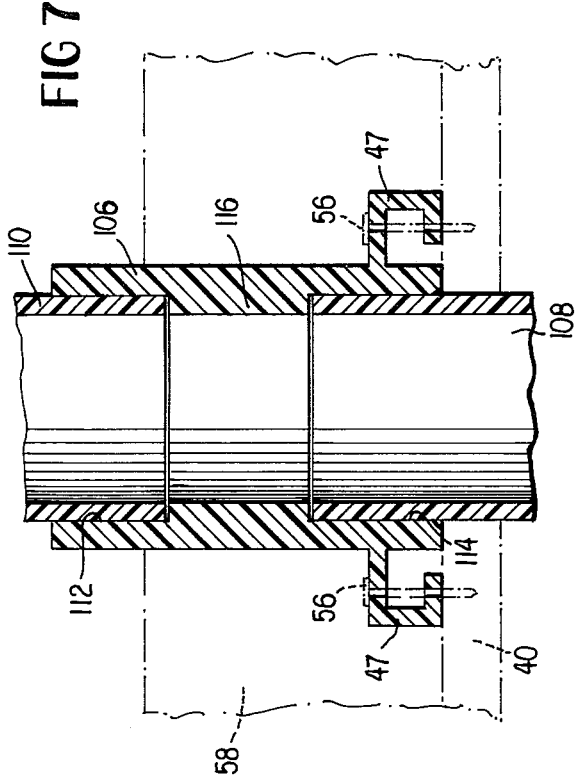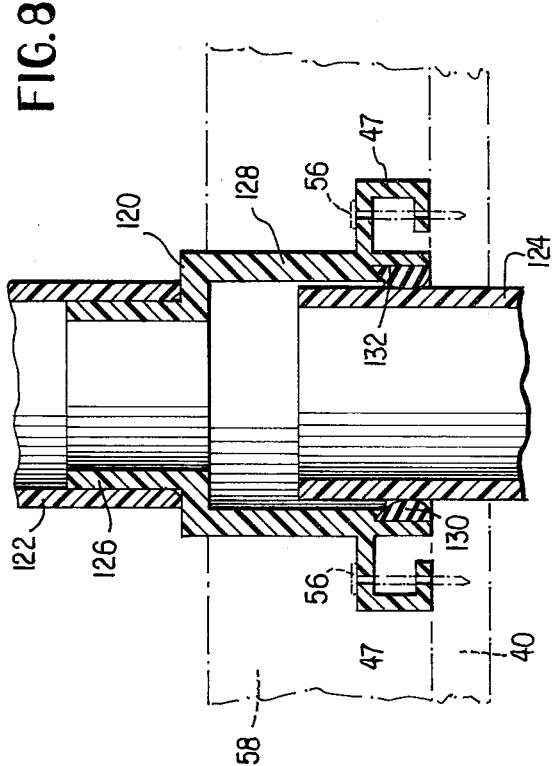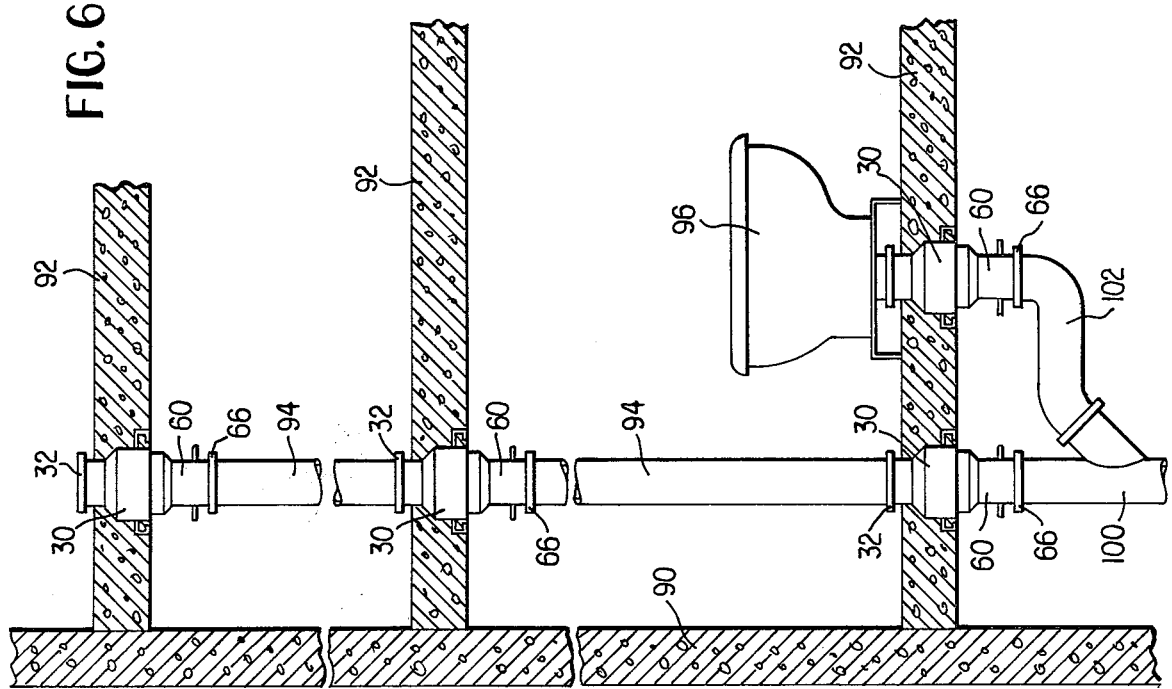

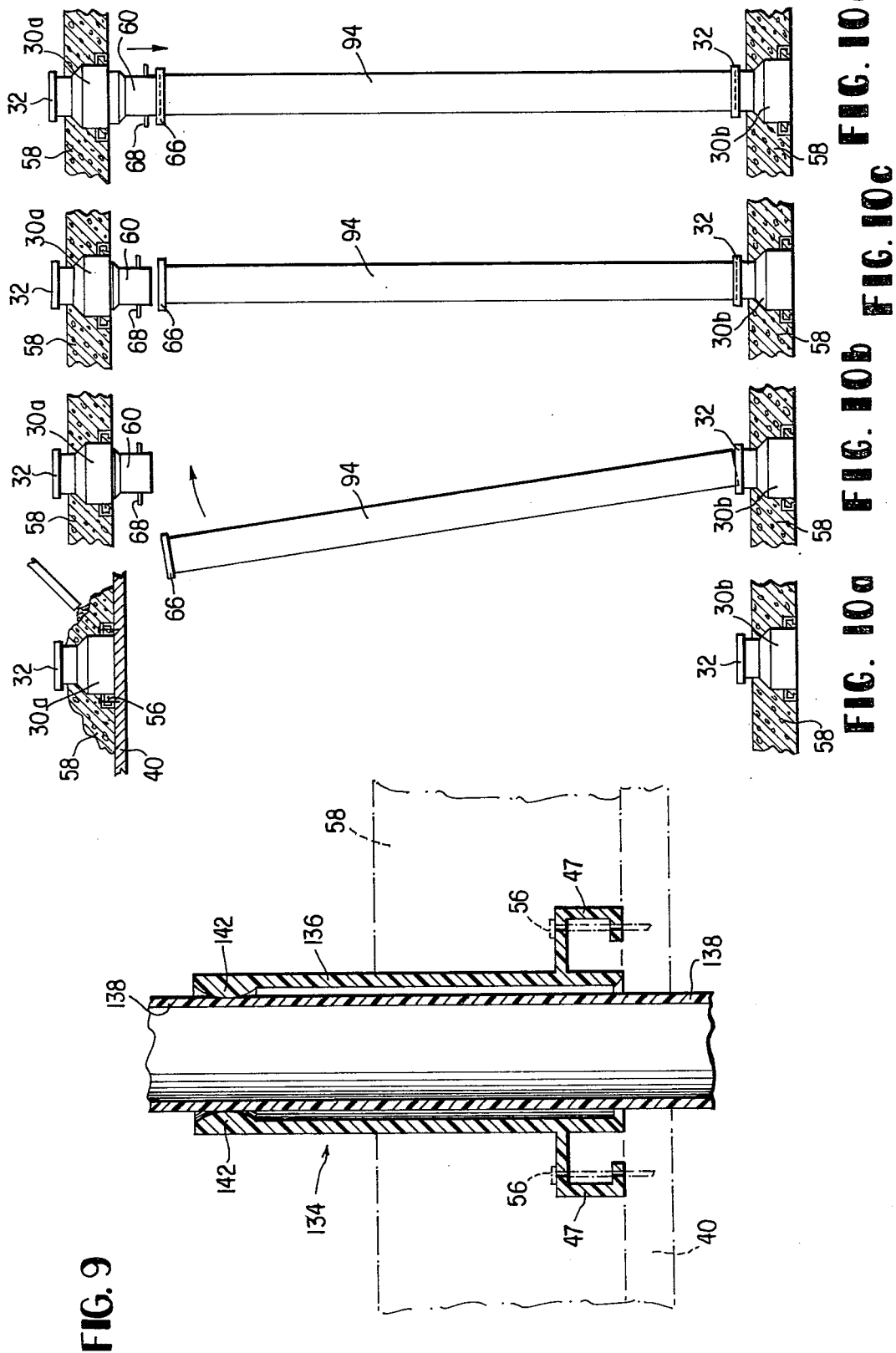

PIPE SUPPORT COUPLING AND METHOD OF USING SAME

PRIOR ART AND OBJECTS

Applicant is unaware of any device adapted to be embedded and anchored in the floor or wall of a building structure which serves as both a support as well as a coupling means for pipe sections extending between the floors.

Heretofore the prior art used tubular pipe sleeves of the type disclosed in U.S. Pat. No. 3,294,358 to C. L. Hagedorn which were secured to the form on which the masonry floor of a building was to be formed. After the masonry floor was poured around these sleeves and allowed to set, the sleeves were knocked out and piping was run through the void formed in the floor. The pipes were then secured against movement relative to the floor by means of riser clamps placed around the pipe adjacent at least the top surface of the floor. If the pipe extending through the void was connected to a toilet, riser clamps were placed on the pipe adjacent the top and bottom surface of the floor to prevent the toilet from rocking or shifting once set in place. In addition to the expense of the riser clamps themselves and the considerable labor cost involved in installing them around each pipe extending through each hole in each floor of a multi-story building, the area in the hole not occupied by piping must, by code in most jurisdictions, be sealed or packed so that a chimney is not created through which fire can pass from one floor to another.

Applicant has invented a novel device which overcomes the substantial disadvantages of the prior art methods of joining and supporting sections of piping extending between the floors of building structures.

It is therefore the main object of this invention to provide an improved pipe coupling and method of using same.

It is another object of this invention to provide a pipe coupling and suppot and method of using same which eliminates the need of pipe sleeves, riser clamps, separate coupling elements and insulative packing associated with the prior art methods.

It is another object of this invention to provide a pipe coupling which is inexpensive to produce, which is easy to install in concrete masonry, tile or wood floors, walls and other structures and which is capable of providing an effective water-tight seal with the pipes connected thereto.

It is another object of this invention to provide a method of using the herein described novel pipe coupling and support which enables the rapid floor to floor installation of pipe sections for plumbing of all types as well as providing a cylindrical enclosure for electrical lines.

Additional objects, advantages and features of the present invention reside in the construction, arrangement and combination of parts and the manner of use, as will be understood from the following description and accompanying drawings wherein:

FIG. 1 is a perspective view of a typical prior art installation using riser clamps for support;

FIG. 2 is a side view in substantial cross-section of one embodiment of the pipe coupling of the present invention embedded in the concrete masonry floor of a building structure;

FIG. 3 is a top view in cross-section of the pipe coupling in FIG. 1 taken along the lines 3—3 thereof;

FIG. 4 is an enlarged view in partial cross-section of the encircled portion of the pipe coupling of FIG. 1;

FIG. 5 is an elevational view in partial cross-section of another embodiment of the invention suitable for use in walls of a building structure;

FIG. 6 is an elevational view of the use of a plurality of pipe couplings of one embodiment of the present invention in a multi-story building structure;

FIG. 7 is an elevational view in cross-section of another embodiment of the present invention;

FIG. 8 is an elevational view in cross-section of another embodiment of the present invention;

FIG. 9 is an elevational view in cross-section of another embodiment of the present invention;

Figure 11A:
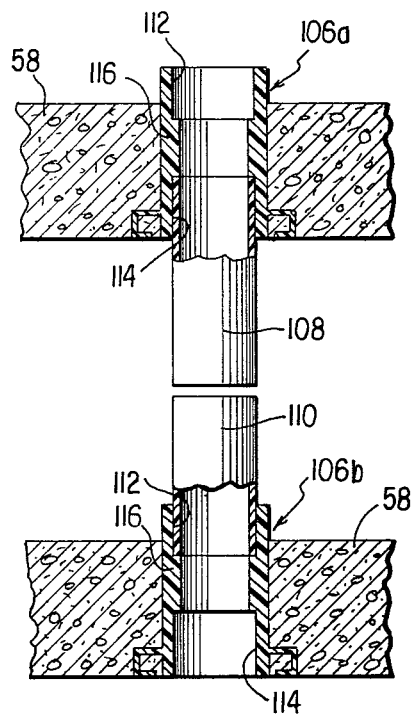
Figure 11B:
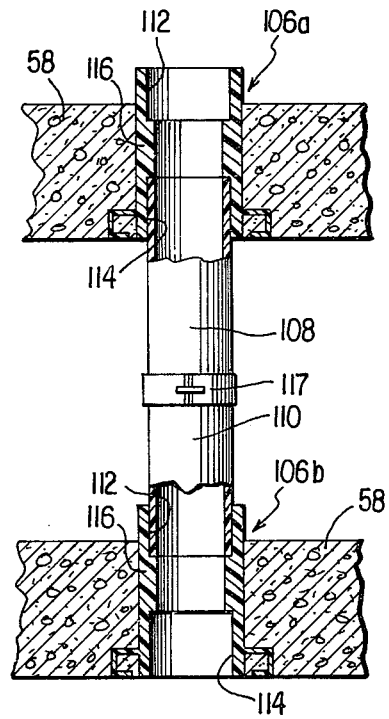
Figure 12A:
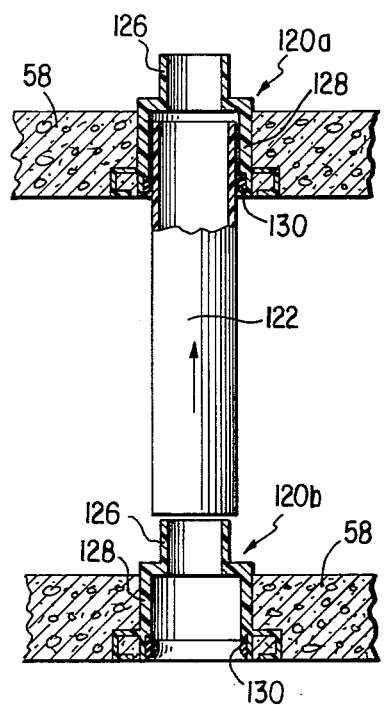
Figure 12B:
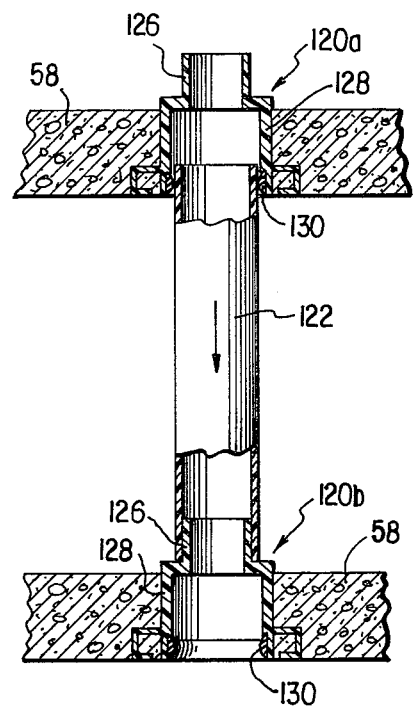

FIG. 10($a$)–($d$) is an illustration of the method of using one embodiment of the device of the present invention;

FIG. 11($a,b$) is an illustration of the method of using another embodiment of the device of the present invention, and FIG. 12($a,b$) is an illustration of the method of using yet another embodiment of the device of the present invention.

DESCRIPTION OF THE PREFERRED EMBODIMENTS

Referring now to the drawings where like characters of reference indicate like elements in each of the several views, FIG. 1 illustrates a typical installation of a pipe section 10 extending through the masonry floor 12 of a building structure. The weight of the pipe section 10 is transmitted to the floor 12 by means of a riser clamp 14 secured by bolts 16 to the pipe section 10. The ends of the riser clamps 14 extend across the hole 18 through the floor adjacent the upper surface thereof. The space between the pipe section 10 and floor 12 is filled or patched by material 20 to prevent the creation of a fire passage. An additional riser clamp 22 is often used adjacent the bottom surface of the floor 12 to prevent the pipe section 10 from rocking.

The pipe support and coupling of the present invention in all of its various embodiments, as will be hereinafter described, eliminates the disadvantages of the prior art as illustrated in FIG. 1.

Referring to FIGS. 2, 3 and 4, one embodiment of the pipe support and coupling device of the present invention is shown at 24 having a substantially rigid unitary member 26 cylindrical in shape and made out of PVC (polyvinyl chloride), steel, cast iron or other material. The unitary member 26 has a continuous wall 28 extending the length thereof defining a first tubular portion 30. The first tubular portion 30 has a first end 32 which is flared out in the form of a hub joint to receive the end 34 of a section of pipe 36. A second end 38 is flat on its end and is placed adjacent the wooden form 40 (shown in phantom lines) when the device is being used as will be more fully described later. The first tubular portion 30 also has a sleeve 42 integrally formed at one of its ends with the first tubular portion 30 and extending concentrically with and spaced apart from the first tubular portion 30 to form a recess 44. The sleeve 42 extends to second end 38 and termintes at an end 46 having a slight taper.

Anchor means 47 in the form of a plurality of extension members 48, integrally formed at one end with the sleeve 42, are provided at equally spaced intervals around the sleeve 42. The extension members 48 have on their other end a leg 50 which, in turn, is connected to a foot 52. A recess 54 is provided in each extension member 48 and foot 52 to accomodate a nail, screw or other fastening means 56 extending therethrough. The recesses 54 are in registry with each other. When the first tubular portion 30 is placed on the wooden floor frame 40, the nails 56 are driven into the floor frame 40 to fasten it securely in place. Applicant has found that two anchor means 46 placed opposite each other are adequate to hold the first tubular portion 30 in position as concrete masonry material for the floor 58 is poured against it. However, when only two anchor means 46 are used, there results a slight tilting of the first tubular portion 30 whenever excessive force is applied at the same time to both the nails 56 and extension member 48. Such tilting results in an intolerable misalignment of the piping connected between coupling devices. In order to insure that the possibility of such tilting and resulting misalignment is minimized, applicants have found that the use of three equally spaced anchor means 47, or even four, result in a more stable platform and one not likely to be tilted by excessive force applied at the same time to both the nails 56 and the extension member 48. As can be seen by referring to FIG. 2, substantially the entire surface of the anchor means 47 is embedded in the concrete masonry material 58 which insures that the entire unitary member 26 will remain in place with respect to the floor 58 when a heavy length of piping 58 is connected thereto.

A second tubular portion 60 is provided having an upper portion 62 thereof the same approximate thickness and diameter as the recess 44 such that it is able to slide freely therein. The lower portion 64 is of an outside diameter slightly less than the inside diameter of a conventional pipe coupling element 66. The lower 64 has radially extending tabs 68, preferably two in number and equally spaced for the user to grip and thereby move the second tubular portion 60 in the recess 44 relative to the first tubular portion 30. As can best be seen by referring to FIG. 4, grooves 70, shaped substantially like a trapezoid, are cut around the outside of the upper portion 62. An O-ring seal 72 made of an elastic material is positioned within the grooves 70 such that when the upper portion 62 is within recess 44, the O-ring 72 provides a watertight seal between unitary member 26 and second tubular portion 60. Thus, after the pipe coupling element 66 is brought into alignment with the second tubular portion 60, the lower portion thereof 64 can be dropped into engagement with the coupling element 66 and secured thereto. Indicia 74, in the form of a scale, can be printed or enscribed on the upper portion 62 to enable a workman to determine, at a glance, the distance the upper portion 62 is withdrawn from recess 44, thus preventing any overextension of the second tubular portion 60.

Referring now to FIG. 5, a coupling device 80, which is a variation of the coupling device of FIGS. 2-4, is disclosed for use primarily in horizontal applications such as for connecting pipes 82 and 84 on either side of a wall 86 of a building structure. The coupling device 80 has first and second tubular portions 30 and 60 respectively and O-ring sealing means 72 which provide a watertight seal whether the second tubular portion 60 is moved within recess 44 or is at rest in recess 44. The first end 32 and lower portion 64 are shown as being cylindrical in shape and of a diameter slightly less than the inside diameter of pipes 82 and 84 respectively to permit connection thereto. Obviously, other configurations such as hubs or threads for the ends 32 and 60 are possible depending on the configuration of the pipe ends connected thereto.

FIG. 6 shows the use of a plurality of coupling devices 26 of the type shown in FIGS. 2-4 in a building structure 90 having a plurality of masonry floors 92. The first tubular portion 30 of the devices 26 are typically embedded in the masonry floors 92 such that the first end 32 remains above the level of the floor and, after removal of the wooden floor form 40 (shown in FIG. 2), a recess substantially the diameter of sleeve 42 is created. The second tubular portion 60 is inserted in first tubular portion 30 and is joined to coupling element 66 of pipe sections 94. As will be noted, the anchor means 47 on each device 26 serves to hold each of those devices 26 in the concrete to support the weight of pipe sections 94. A toilet 96 is shown also having a pipe section or fitting 98 which is positioned in the first end 32, the second tubular portion 60 is connected to a coupling element 66 which, in turn, is connected to a Y-shaped fitting 100 via pipe 102. The anchor means 47 in this type of installation for a toilet 96 eliminates the necessity of using riser clamps above and below the floor substantially as shown in FIG. 1. The anchor means 47 serves to support the connecting piping as well as to prevent the toilet 96 itself from rocking back and forth during use.

Referring now to the various additional embodiments of FIGS. 7, 8 and 9, FIG. 7 shows a support and coupling device 106 being substantially cylindrical in shape and of one-piece, molded construction. It would preferably be made of PVC material to enable it to be connected to piping 108 and 110 made of similar material. The device 106 has anchor means 47 which serves the same function as those previously described with regard to FIG. 2. The device 106 has upper and lower internal surfaces 112, 114 respectively, which terminate at a center portion 116, whose internal diameter is substantially the same as the internal diameter of the piping 108, 110 to insure a smooth, uninterrupted surface for the flow of liquid therethrough. The installation of the device 106 is the same as will be hereinafter described with regard to the method of practicing this invention.

FIG. 8 shows another embodiment of a support and coupling device 120 which is preferably made out of cast iron or steel, and which is for use with similar piping 122, 124. The anchor means 47 are integrally formed with the rest of the device 120 and of the same material, it being understood, of course, that the entire device 120 could also be made of PVC material, as shown in the drawings. The upper portion 126 of this embodiment is cylindrical in shape and of a diameter slightly less than the internal diameter of the pipe 122. The upper portion 126 could also be shaped in the form of a hub as in the first end 32 of the embodiment of FIG. 2. The lower portion 128 is also cylindrical in shape and somewhat longer than the outside diameter of the pipe 124 to facilitate receiving pipe 124 into that lower portion 128. An elastic gasket or O-type sealing ring 130 is positioned in a recess 132 and it seals the outside surface of pipe 124 to prevent any leakage of water. The lower portion 128 must be long enough to receive the insertion of pipe 124 and facilitate the connection of the other end of pipe 124 to another similar coupling device 120 (not shown) located in the floor below. This structure will be explained more fully later with regard to the method of practicing the invention.

FIG. 9 shows yet another embodiment 134 of the present invention. Here a straight, cylindrically shaped tube 136, having anchor means 47, is used. This embodiment allows for the insertion of sections of pipe 138 for electrical cables, fluid or gas transmission. The device 134 does not act as a coupling for sections of piping as do the other embodiments of the invention; however, by means of the unique internal construction of the tube, the pipe or pipes 138 are held in place relative to the sides of the tube 134. This support is achieved by forming integrally with the inside surface 140 of the tube 136 an inwardly, radially extending projection 142. The projection 142 grips the sides of the pipe(s) 138 as the pipe(s) 138 are forced past the projection and out the other end of the tube 134. Additional projections could be formed in the sides of the tube 136 if more gripping strength were needed. The anchor means 47 again functions as described above, namely, it maintains the entire device 134 in position relative to the masonry floor 40, thus eliminating the need for riser clamps 14.

Referring now to FIG. 10(a)-(d), an illustration is presented of the various steps in practicing the invention using the device 24. Normal construction techniques in building multi-story structures, particularly commercial buildings, require the use of a wooden floor form 40 which is supported from below, and over which a masonry substance, such as concrete, is poured to form the floor 12. The locations where the riser pipes are to extend through the floor 12 are marked on the wooden forms 40 prior to pouring the concrete. The first tubular portion 30 is placed on the wooden form 40 over the marked locaton (see FIG. 10(a)). Fastening means such as nails 56 are placed in recesses 54 of anchor means 47 and driven into the wooden form 40. The nails 56 securely hold the first tubular portion 30 of device 24 in position. Masonry material 58 is then poured around the devices and in, through and around the extension members 48 and legs 50 of the anchor means 47. After the masonry material 58 sets, the wooden forms 40 are removed and a recess remains substantially the size of the inside diameter of the lower cylindrically-shaped portion of the device 24, or, in the case of the embodiment of FIG. 2, the inside diameter of sleeve 42.

After two such first tubular portions 30a and 30b are embedded in successive floors as shown in FIG. 10(b), a second tubular portion 60 is inserted in recess 44 of the first tubular portion 30(a). A pipe section 94 then has one of its ends placed in the end 32 of the first tubular portion 30(b) and is pivoted so that the coupling element 66 on the other end of the pipe section 94 is aligned with the upper second tubular portion 60, as shown in FIG. 10(c). The upper second tubular portion 60 is then brought down into engagement with the coupling element 66 by gripping tabs 68 and there cemented in place, as shown in FIG. 10(d). This procedure is followed for each floor until the entire pipe tree is completed.

Referring now to FIG. 11, I have illustrated several of the steps in practicing the method of the present invention using a device 106 of FIG. 7. The steps of securing the device 106 to the wooden floor form 40 and embedding the device 106 in masonry material 58 are the same as previously described with reference to FIG. 10(a). After the devices 106(a) and 106(b) are in position, one end of the pipe section 108 is inserted in and secured to the lower internal surface 114 of device 106(a) and one end of the pipe section 110 is inserted in and secured to the upper internal surface 112 of the device 106(b) as shown in FIG. 11(a). The other ends of the aligned pipes 108 and 110 are then secured together by means of a separate coupling element 117 to complete the installation as shown in FIG. 11(b).

FIG. 12 illustrates several of the steps in practising the present invention using a device 120 of FIG. 8. The steps of securing the device 120 to the wooden floor form 40 and embedding the device 120 in masonry material are the same as those steps described with regard to FIG. 10(a). After the devices 120(a) and 120(b) are set, one end of the pipe section 122 is inserted into lower portion 128 of device 120(a) a distance sufficient to clear upper portion 126 of device 120(b) and swing into alignment with device 120(b). The pipe section 122 is then pulled down so that the other end of pipe section 122 fits over upper portion 126 of device 120(b) and is cemented there. The O-ring gasket 130 will insure a watertight seal of the pipe 122 in lower portion 128 of device 120(a). The various pipe sections 82, 84, 108, 110, 122 and 124 can also be connected to the various coupling and support devices of the present invention by means of threads, welding, solder, glues and the like, depending on the material used in constructing the devices and other mechanical considerations.

The foregoing description is considered illustrative only of the principles of the invention and its method of use. Since numerous modifications and changes will readily occur to those skilled in the art, it is not desired to limit the invention to the exact construction and operation shown and described, and, accordingly, all suitable modifications and equivalents may be resorted to, falling within the scope of the invention.

What I claim is:

1. A device adapted to be embedded in the masonary floor of a building structure for supporting piping in connected relationship thereto, either connected thereto at the ends thereof or extending therethrough, said device comprising:
   (a) a substantially rigid unitary member including a continuous wall defining a first tubular portion having a first end and a second end, said first tubular portion having a concentric, spaced-apart sleeve formed integrally therewith extending to said second end to form a recess between said first tubular portion and said sleeve, and a second tubular portion having one end thereof slidably mounted in said recess in sealing engagement with said sleeve, and the other end thereof adapted to be joined to one end of said piping, and
   (b) anchor means integrally formed with said unitary member and extending radially outward therefrom, said anchor means being substantially surrounded by said masonry floor to maintain said unitary member in position relative to said floor.

2. A device as set forth in claim 1 wherein said second tubular portion has grip means intermediate the ends thereof for engagement by the hands of the user to slide said second tubular portion relative to said first tubular portion.

3. A device as set forth in claim 2 wherein said second tubular portion includes at least one O-ring seal means positiond to provide sealing engagement with said sleeve means.

4. A device as set forth in claim 3 wherein said O-ring seal is positioned in a slot shaped substantially like a trapezoid.

5. A device as set forth in claim 3 wherein said O-ring seal is positioned in a slot shaped substantially like a trapezoid.

6. A device as set forth in claim 1 wherein said anchor means has a recess therethrough for receiving a means for securing said unitary member in position.

7. A device adapted to be located in the wall of a building structure for coupling the ends of pipe sections extending on either side of said wall, said coupling device comprising:
   a. a substantially rigid unitary member including a continuous wall defining a first tubular portion having a first end and a second end, said first tubular portion having a concentric, spaced-apart sleeve formed integrally therewith extending to said second end to form a recess between said first tubular portion and said sleeve, and
   b. a second tubular portion having one end thereof slidably mounted in said recess in sealing engagement with said sleeve means, and the other end thereof adapted to be joined to one end of said piping.

8. A device as set forth in claim 7 wherein said second tubular portion includes at least one O-ring seal means positioned to provide sealing engagement with said sleeve means.

9. The method of supporting in connected relationship sections of pipe extending between the floors of a building structure comprising the steps of:
   (a) providing a substantially rigid unitary member including a continuous wall portion defining a first tubular portion having a first end and a second end, at least one of said first or second ends adapted to receive an end of one of said sections of pipe, said first tubular portion having a concentric, spaced-apart sleeve formed integrally therewith extending to said second end to form a recess between said first tubular portion and said sleeve and a second tubular portion having one end thereof slidably mounted in said recess and sealingly engaging said sleeve means and having an anchor means integrally formed with said unitary member and extending radially outward therefrom,
   (b) securing said unitary member in position,
   (c) pouring masonry material around said unitary member so as to embed said anchor means therein,
   (d) connecting an end of one of said sections of pipe to said first or second end of said tubular portion adapted to receive same,
   (e) bringing an end of another of said pipe sections into alignment with said second tubular portion, and
   (f) sliding said second tubular portion into engagement with said end of said other pipe section.

10. The method as set forth in claim 9 further comprising the steps of:
   a. providing a plumbing fixture,
   b. connecting said plumbing fixture to said first end, and
   c. connecting an end of one of said sections of pipe to said second end adapted to receive same.

* * * * *